United States Patent
King et al.

(10) Patent No.: US 11,231,945 B2
(45) Date of Patent: Jan. 25, 2022

(54) SYSTEMS AND METHODS FOR LIVE HELP

(71) Applicant: INTEGENX INC., Pleasanton, CA (US)

(72) Inventors: David King, Menlo Park, CA (US); Chungsoo Charles Park, Redwood City, CA (US)

(73) Assignee: Integenx, Inc., Pleasanton, CA (US)

( * ) Notice: Subject to any disclaimer, the term of this patent is extended or adjusted under 35 U.S.C. 154(b) by 8 days.

(21) Appl. No.: 16/941,169

(22) Filed: Jul. 28, 2020

(65) Prior Publication Data

US 2020/0409728 A1 Dec. 31, 2020

Related U.S. Application Data

(63) Continuation of application No. 15/761,066, filed as application No. PCT/US2016/052930 on Sep. 21, 2016, now Pat. No. 10,725,801.

(Continued)

(51) Int. Cl.
*G06F 3/0481* (2013.01)
*G06F 9/451* (2018.01)
(Continued)

(52) U.S. Cl.
CPC ............ *G06F 9/453* (2018.02); *G06F 3/0487* (2013.01); *G06Q 30/016* (2013.01)

(58) Field of Classification Search
CPC ...... G06F 3/0481; G06F 3/0488; G06F 3/011; G06F 9/4443; G06F 9/453; G06F 3/0487;
(Continued)

(56) References Cited

U.S. PATENT DOCUMENTS 5,655,066 A 8/1997 Martin et al.
8,695,872 B2 * 4/2014 Braunstein ........... G06Q 10/087
235/379

(Continued)

FOREIGN PATENT DOCUMENTS

CN 101866215 A 10/2010
CN 103485784 A 1/2014
CN 103761667 A 4/2014

OTHER PUBLICATIONS

International Preliminary Report on Patentability dated Apr. 4, 2018, issued in PCT Application No. PCT/US2016/52903, filed Sep. 21, 2016.

(Continued)

*Primary Examiner* — Steven P Sax
(74) *Attorney, Agent, or Firm* — Workman Nydegger

(57) ABSTRACT

A live help system provides an intuitive display of help information on a user's graphical user interface. A request is received from a client device for help, and a live help provider interface is initiated at a live help location. Data is acquired regarding a user's location, including data on external devices in the user's location. Indicators are provided to allow the live help provider to point to or otherwise indicate items on the user interface or outside of the user interface. Live help input is captured at the live help provider interface. Instructions are then transmitted to the display of the client device to display live help input, as though the agent were present and interacting with or indicating items on the screen or off the screen.

17 Claims, 8 Drawing Sheets

Related U.S. Application Data

(60) Provisional application No. 62/222,485, filed on Sep. 23, 2015.

(51) Int. Cl.
*G06F 3/0487* (2013.01)
*G06Q 30/00* (2012.01)

(58) Field of Classification Search
CPC .... G06F 3/0484; G06Q 30/016; G06Q 30/02; A63F 13/005; G05B 19/042; G08C 23/04; A61B 6/12
See application file for complete search history.

(56) References Cited

U.S. PATENT DOCUMENTS

| | | |
|---|---|---|
| 2004/0048233 A1 | 3/2004 | Matthews et al. |
| 2005/0183021 A1 | 8/2005 | Allen et al. |
| 2007/0259716 A1* | 11/2007 | Mattice ............... G06F 3/0488 463/36 |
| 2007/0265992 A1* | 11/2007 | Heidenreich ........... G06N 5/04 706/45 |
| 2007/0279484 A1 | 12/2007 | Derocher et al. |
| 2011/0035058 A1* | 2/2011 | Clough ................ G10L 17/00 700/275 |
| 2011/0244928 A1 | 10/2011 | Cherpes et al. |
| 2012/0272162 A1* | 10/2012 | Surin ................... H04L 67/38 715/753 |
| 2013/0066750 A1 | 3/2013 | Siddique et al. |
| 2013/0124641 A1 | 5/2013 | Ryabchun et al. |
| 2013/0141567 A1* | 6/2013 | Walker ............. H04M 1/72412 348/135 |
| 2013/0197357 A1* | 8/2013 | Green ................... A61B 6/12 600/424 |
| 2013/0215116 A1 | 8/2013 | Siddique et al. |
| 2013/0258117 A1* | 10/2013 | Penov ................ G06K 9/2081 348/207.1 |
| 2014/0033310 A1 | 1/2014 | Cheng |
| 2014/0054254 A1* | 2/2014 | Ogawa ................. B66C 13/40 212/276 |
| 2014/0080556 A1* | 3/2014 | Knutsson ............. A63F 13/79 463/7 |
| 2014/0169795 A1* | 6/2014 | Clough ............... G08C 23/04 398/106 |
| 2014/0208163 A1 | 7/2014 | Domke et al. |
| 2015/0012394 A1 | 1/2015 | Rossi et al. |
| 2015/0025915 A1 | 1/2015 | Nicholas |
| 2015/0057837 A1 | 2/2015 | Moore, Jr. |
| 2015/0135108 A1* | 5/2015 | Pope .................... G06F 3/0484 715/767 |
| 2015/0243071 A1 | 8/2015 | Jovanovic |
| 2015/0324077 A1* | 11/2015 | Dore ................... G06F 3/0346 715/735 |
| 2016/0077422 A1* | 3/2016 | Wang .................. G03B 37/04 348/38 |
| 2016/0171579 A1 | 6/2016 | Van Deloo |
| 2016/0191887 A1 | 6/2016 | Casas |
| 2017/0097621 A1* | 4/2017 | Ackmann .......... G05B 19/0426 |

OTHER PUBLICATIONS

International Preliminary Report on Patentability dated Apr. 4, 2018, issued in PCT Application No. PCT/US2016/52930, filed Sep. 21, 2016.
International Search Report and Written Opinion dated Dec. 9, 2016, issued in PCT Application No. PCT/US2016/52903, filed Sep. 21, 2016.
International Search Report and Written Opinion dated Dec. 9, 2016, issued in PCT Application No. PCT/US2016/52930, filed Sep. 21, 2016.

\* cited by examiner

— 1 —

SYSTEMS AND METHODS FOR LIVE HELP

CROSS REFERENCE TO RELATED APPLICATIONS

This application is a continuation of U.S. application Ser. No. 15/761,066, now U.S. Pat. No. 10,725,801, which is a nationalization of PCT Application No. PCT/US2016/052930, filed Sep. 21, 2016, which claims priority to U.S. provisional patent application 62/222,485, filed Sep. 23, 2015. The content of each of the above applications is incorporated by reference in its entirety.

STATEMENT AS TO FEDERALLY SPONSORED RESEARCH

None.

COPYRIGHT NOTICE

Pursuant to 37 C.F.R. 1.71(e), applicant notes that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

The present invention relates to logic systems. More particularly, it relates to computer systems and associated systems and methods that provide an interactive interface for live help. In further embodiments, one or more methods may be implemented on a data handling device or system, such as a computer or other information enabled device.

BACKGROUND OF THE INVENTION

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

With the increasing complexity and ubiquity of interactive digital devices, such as computers, tablets, smartphones, and appliances, it is often desirable for a user of a computing system to receive online help. In such a situation, the online help may instruct the user to perform certain tasks by describing how to perform the tasks verbally or in written text. In some situations, remote control is taken of a person's computer or device. An assistant may move a cursor, enter text, or activate buttons on the remote user device or instrument. Such remote control methods generally show the assistant the same view of the screen that is visible to the user.

Another typical method of providing online help to users involves establishing two way video calling or conferencing using computing devices with front-facing cameras. A common configuration of such systems involves a user viewing a live image of a caller on their computer screen, sometimes with an inset window or showing the user his own image on his screen.

SUMMARY

Systems and methods according to specific embodiments described herein provide a method of interaction between a user and live help where the two parties communicate with each other by visually referencing the physical locations of various features of the device through which the two parties communicate and, in some embodiments, of surrounding devices or systems.

The invention allows a live human agent or an automated helper (hereinafter referred to interchangeably as "agent") to point to a portion of a user's display as if the user is standing on the other side of the display and the display is a window (or optionally, in some embodiments, a mirror.) The agent may direct the user to various components, located on or off the user's graphical user interface ("GUI"), by pointing to a feature either on or outside of the user's GUI. In some embodiments, one or more physical features outside the user's display, at the user's location or surrounding area, are identifiable at the live help location. The agent or the agent's interface is thus capable of processing or identifying the geographical locations of the physical features outside of the user's display area, without needing to view the physical features. In some embodiments, the system may be referred to as geographical live support.

In some embodiments, one or more sensing, detecting or data capturing devices, such as a camera, touch sensor, heat sensor, or sonar, may be used to detect the motion of the user. In some embodiments, such devices may detect the motion of the agent or helper. Such motion detection may function in addition to any pointing device provided with the computer system.

In some embodiments, systems and methods for live help as described herein provide more intuitive understanding of instructions referring to features of the device. In some embodiments, a user is shown a live or animated video image of the agent. In some embodiments, the placement of the agent's pointing device is displayed on the user's screen as though the agent is pointing to a feature in the user environment. In some embodiments, an image of an agent or a portion of the agent, such as a hand or arm, can be displayed as superimposed over the user's GUI. The image may be partially transparent, so that elements of the user GUI and the agent are visible to the user.

A help system or method of this disclosure can communicate through a communications network with users requesting help and agents providing the help. The communications network can be any electronic communications network. Network connectivity can be through any medium, such as cell service, Internet, radio, television, etc. The interface with the user or service provider can be any appropriate computing device. For example, the device can be a smart phone, a tablet, a laptop computer, a desktop computer or a television.

In some embodiments, methods, systems and/or devices are described that can be used together or independently to provide improved live help and optional related features as described herein.

In other embodiments, a user system includes operative elements located in predetermined positions that are known to the system. These elements can include, for example, a camera, microphone, fingerprint reader, or sample cartridge slot. In some implementations, the user interface can graphically display the positions of specific elements when instructing a user to take actions. Such elements may be located in the user's GUI.

Various embodiments provide methods and/or systems for interaction over a communications network. In some embodiments, a user or client system is provided with a set of GUIs that allow a user to view various data or information related to the user's system, and allow a user to view live help as described herein. In response to a user's action requesting help and the completion of appropriate workflow steps, the user system sends necessary information to a live help system in order to request help. The live help system uses the request data and one or more sets of help data to process the request. In some embodiments, a client system is provided with an executable code file that allows the client system to operate as described herein.

An important application for the present invention, and an independent embodiment, is in the field of exchanging data over the Internet or private networks. In some embodiments, Internet media protocols and formats may used, such as HTTP, RTTP, XML, HTML, dHTML, or VRML. In some embodiments, image, audio, or video formats or algorithms may be used. However, using the teachings provided herein, it will be understood by those of skill in the art that the methods and apparatus of the present invention could be advantageously used in other related situations where users access content over a communication channel, such as modem access systems, institution network systems, and wireless systems.

All publications, patents, and patent applications mentioned in this specification are herein incorporated by reference to the same extent as if each individual publication, patent, or patent application was specifically and individually indicated to be incorporated by reference.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The included drawings are for illustrative purposes and serve only to provide examples of possible structures and operations for the disclosed inventive systems, apparatus, methods and computer program products for providing an interactive interface for live help. These drawings in no way limit any changes in form and detail that may be made by one skilled in the art without departing from the spirit and scope of the disclosed implementations.

DESCRIPTION OF SPECIFIC EMBODIMENTS

Figure 1:
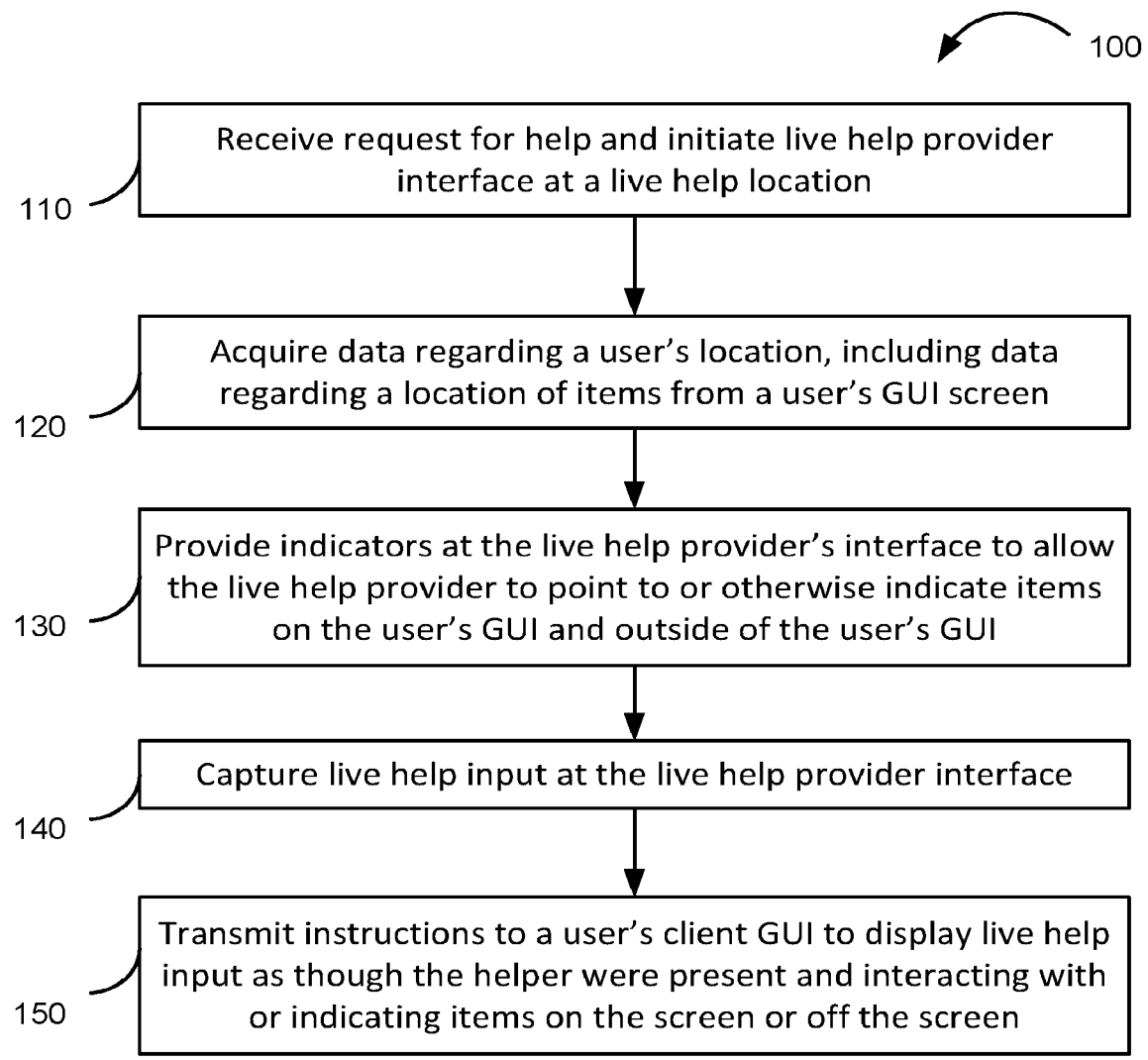
FIG. 1 is a flow chart illustrating methods according to specific embodiments.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods, and computer program products are configured for providing an interactive interface for live help.

In systems that provide online assistance, remote desktop control is often used to provide a live agent or automated helper with a view and control of the user's screen. However, these systems are generally limited. Remote control may be limited only to what is visible on the screen, and often only shows a user screen with icons. An agent is unable to directly view or indicate any area outside of the screen. For many users, help is not effective.

By way of illustration, a manufacturer of food products named Acme Foods may run a research and development lab that uses several machines to test, analyze, and identify components of food and ingredient samples. One such machine operates by a lab technician inserting a food sample into a sample tray. The machine then analyzes the food sample and identifies test results of that food sample. Other machines in the same room as this machine serve the purpose of preparing the food sample for appropriate analysis. The lab technician is having a problem with the machine that is producing inconsistent results for food samples. The lab technician navigates to a help section of the machine, where an option is offered to connect to a live agent for assistance with technical issues. The lab technician and agent are connected, and the live agent is able to remotely control the GUI of the food sample machine to diagnose any issues. Unfortunately, the GUI does not present any indications of a problem. The agent suspects there is a problem with the food preparation occurring in the other machines, but has no way to identify what those machines are, or observe their actions. In addition, the live agent wishes to instruct the lab technician on how to perform a touch gesture on the machine's screen to correctly calibrate the machine, but has no easy way to explain to the lab technician how to gesture, and in what area of the screen. Thus, the lab technician cannot adequately be helped, and the problem is not solved.

Some of the disclosed techniques can be implemented to provide for a method of interaction between a user and live help where the two parties communicate with each other by visually referencing the physical locations of various features of the device through which the two parties communicate and, in some embodiments, of surrounding devices or systems. In some embodiments, a live agent may have the capability to physically point to or perform gestures at a specific location of the user's screen. In some embodiments, a live agent may also be able to identify, observe, or indicate different devices at a user's location or surrounding area.

Applying some embodiments of the disclosed techniques, an alternative scenario to that described above is presented. When the lab technician connects to the live agent for assistance, the live agent is able to see the user's display as if it is seen through a window, with all GUI elements provided to the live agent as if the agent and lab technician are standing at opposite ends of the window. The agent is able to point to, and perform gestures at, various locations of the GUI on the food sample machine. Thus, to demonstrate how to calibrate the machine, the agent performs a touch gesture on the lower portion of the screen. The lab technician sees the gesture take place on the screen in real-time, by a representation of a finger touch on the screen, and understands how to calibrate the machine properly. In addition, the agent is able to see representations of the other devices in the user's room. The agent is able to point to another device in the user's room that the user needs to calibrate properly in order for the food sample machine to function as intended. The lab technician calibrates that machine properly as well, and the problem is solved. Due to the techniques for live help presented within, Acme Foods is able to solve the technical problems with machines in their research and development laboratory. In this way, this alternative scenario demonstrates an improvement on the live help and assistance associated with one or more networked devices.

Operation

FIG. 1 shows a flow chart of an example method 100 for providing an interactive interface for live help.

Figure 4:
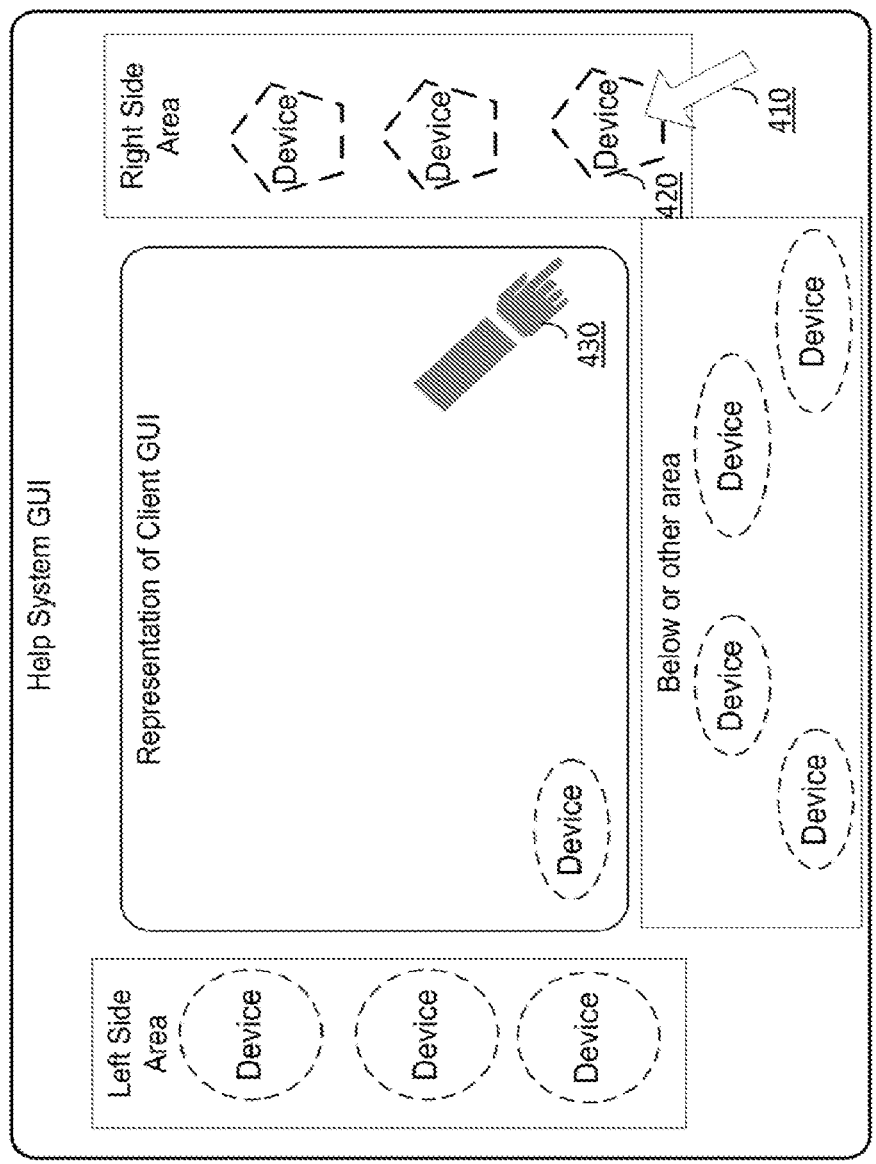
FIG. 4 is an example agent GUI showing a representation of a client GUI and representations of client integrated and external devices according to specific embodiments.

At block 110, the system receives a request for help and initiates a live help provider interface at a live help location. In some embodiments, a live help session is typically initiated when a request for live help is received at an agent's location or workstation. In some embodiments, the live help system provides the agent with an interface, such as a GUI, that allows the agent to indicate items on the user's GUI as well as items or devices external to the user's GUI. In some embodiments, an agent sees the user's GUI and representations of devices outside of the users GUI such as shown in FIG. 4.

At block 120, the system acquires data indicating the placement or location of one or more external devices stored at the agent's system. In some embodiments, data regarding external devices can be provided by a camera at the user's system that captures devices around the user's system, such as multiple cameras or a fish eye camera.

At block 130, an interface at the agent's location provides indicators to allow the live help provider to point to or otherwise indicate items on the user's GUI and outside of the user's GUI. These indicators can be variously arranged and displayed by the live help system to provide an easy way for an agent to understand the user's location and provide help. In some embodiments, an agent provides help by pointing or otherwise indicating objects on the user's GUI and pointing to or otherwise indicating devices outside of the user's GUI. In some embodiments, a virtual reality environment is presented at the agent's location, allowing the agent to indicate actions relating to various objects in the user's environment. In some embodiments, augmented reality environments and mixed reality environments may be presented at the agent's location. In some embodiments, the agent may be using one or more devices that provide virtual reality, augmented reality, or mixed reality environments, such as a headset, glasses, or controller.

At block 140, the live help system captures the agent's actions.

In some embodiments, the agent's actions may include pointing, gesturing, indicating, or otherwise interacting with one or more elements on or off of the user interface. In some embodiments, the agent's actions include indicating one or more external devices outside of the client device. In some embodiments, the live help system captures the agent's action in real time or substantially real time as the agent performs the actions. The actions may be captured through one or more detection and capturing devices, such a pointing device, a keyboard, a motion capture device, or an imaging device. In some embodiments, a motion capture device may be used that includes sensing or capturing components, such as a camera, a proximity sensor, a smart glove, a sonar, or an echolocation sensor.

At block 150, the live help system translates the agent's actions to instructions for display at the user's system and transmits those display instructions to the user's system. Live help is displayed at a user's system using one or more of: graphical indications related to help regarding objects on the user's GUI or devices external to the user's GUI; live video showing an agent indicating objects or demonstrating operations; test input by an agent; and audio from an agent.

User Location and User Interface

A user location as described herein generally refers at least to a user's computing system and the integrated parts thereof. In further embodiments, a user's location can refer to areas generally near a user's computer system or otherwise associated with a user's computer system. Such areas may contain one or more external devices or equipment.

A user device, client device, or instrument as described herein may most commonly be understood as a general consumer computing product, such as a smart TV, tablet, laptop, smart phone, other smart appliance, etc. However, in some embodiments, a user device may also by understood as any logic enabled device that provides a user display and/or interface system, such as, but not limited to, medical diagnostic or treatment systems, industrial systems, laboratory or research systems, and special purpose workstations.

As further described herein, a user location may include a wide variety of different devices with known or otherwise determinable locations with reference to the user GUI. A work bench at a medical diagnostic laboratory station, for example, will typically have at least one device with a GUI, such as a computer system, but may have dozens of different types of equipment surrounding the device with a generally organized spatial arrangement. In some embodiments, equipment can include electrical or other components that are integrated with the user computer system, such as a space for receiving a sample cartridge or similar device. Equipment can also include non-integrated devices or objects, such as stand-alone electronic devices, test tubes, or any other device.

In some embodiments, a user's location and/or the location of one or more devices at the user's location may be determined by a variety of location technologies. For example, the system may determine the location of a user or device by GPS, RFID, or NFC technology.

In some embodiments, multiple devices or users can connect with each other in a networked or distributed fashion. One or more devices may communicate with other devices at the user's location, providing information on their location, status, or more. An agent may receive such networked or distributed data on devices, and may use such data for the purpose of providing assistance. For example, a device may communicate with another connected device that it has not been calibrated before an operation was performed. An agent may receive this information and then use it in order to provide a solution to the user about which device needs to be calibrated at the user's location.

Systems and methods according to specific embodiments as described herein provide, on a graphical user display or GUI, live help that more directly and naturally indicates objects at the user's location, whether on the user's screen or in the user's environment.

Figure 2:
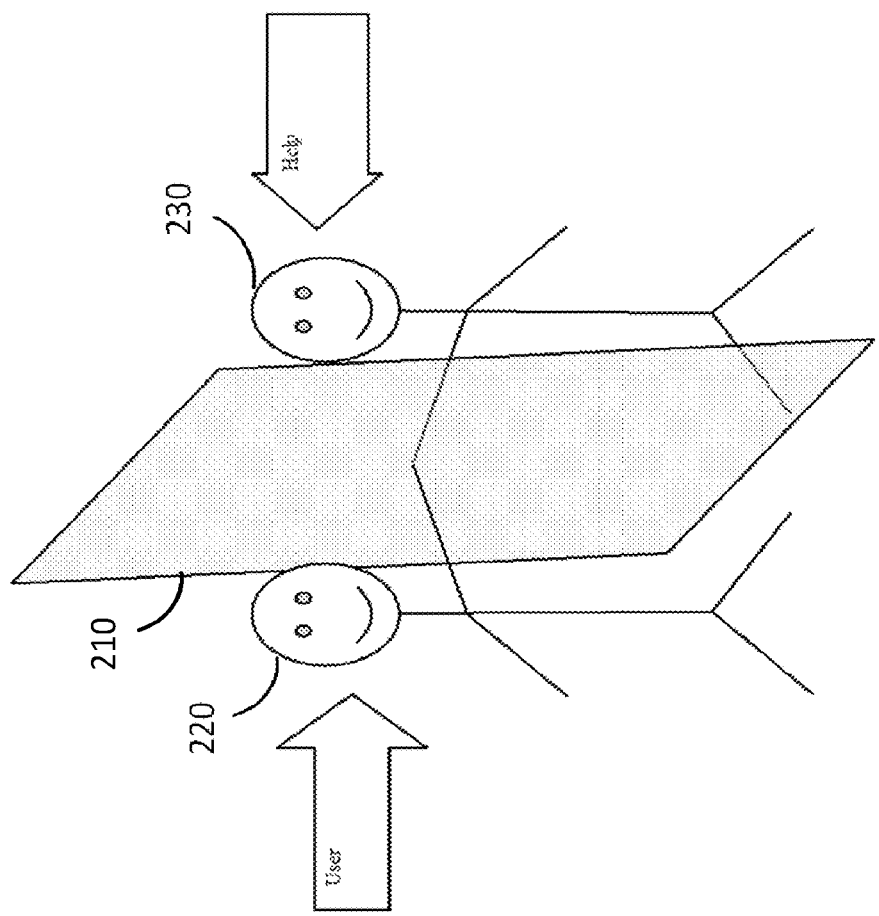
FIG. 2 is a block diagram showing a virtual transparent window interface according to specific embodiments.

FIG. 2 is a block diagram showing a virtual transparent window interface according to specific embodiments. In some embodiments, a "transparent window" interface 210 allows a user 220 to see indications and actions on his interface as though they were being provided by an assistant 230 on the other side of the "transparent window." According to specific embodiments, a user 220 may see a live face and pointing or other actions as though through a "transparent window". In other embodiments, a user 220 may see a representational action such as a finger touch, finger point, gesture, or hand action such as picking up equipment. In some embodiments, this representational action occurs without the user 220 seeing a full projection of a person. The help information can be displayed in a separate "window" on a display screen or can be overlaid so that a user 220 sees aspects of the user's GUI and sees live help actions through or behind that GUI.

Figure 3:
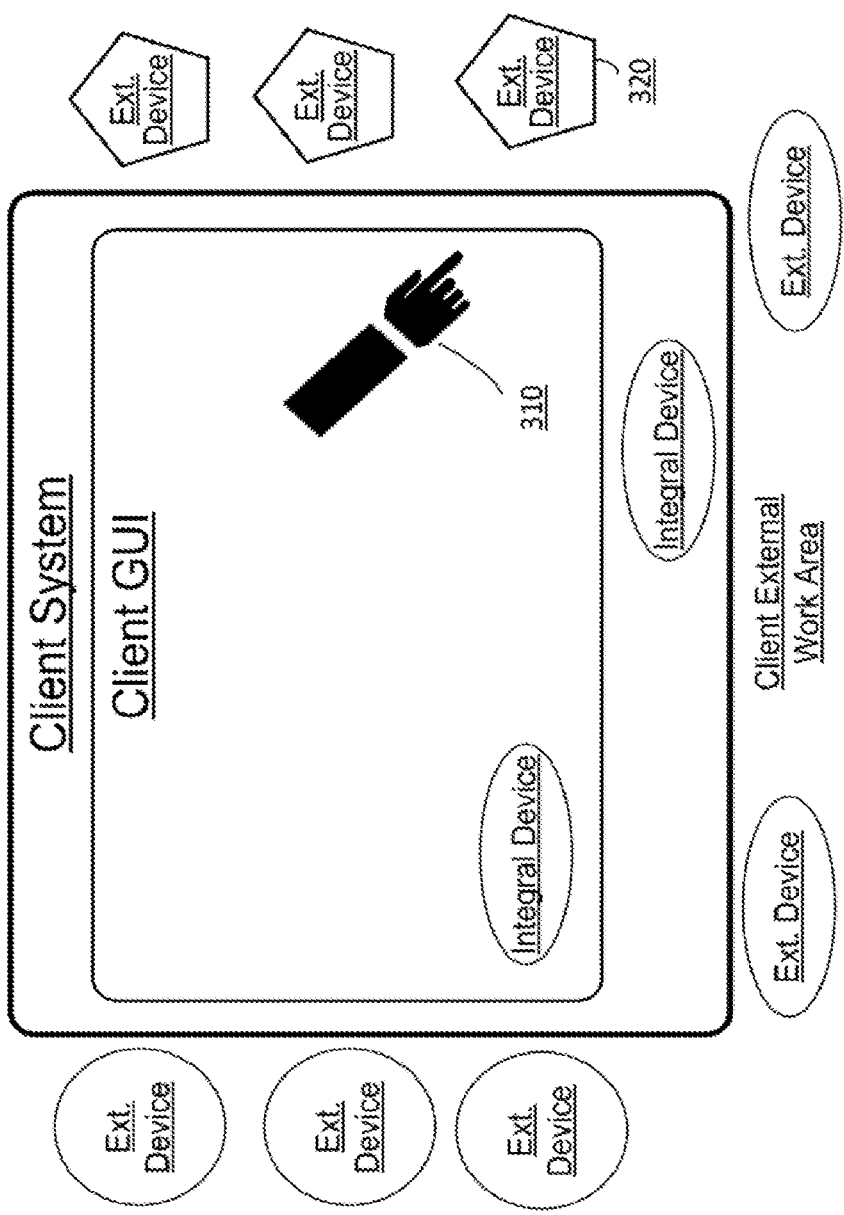
FIG. 3 is an example client computer system showing a client GUI and integrated and external devices according to specific embodiments.

FIG. 3 is an example client computer system showing a client GUI and integrated and external devices according to specific embodiments. As an example of only some specific embodiments, consider a user system or instrument at a medical laboratory. Such a system may include a screen as shown, optionally one or more integrated devices, such as a QRC reader, and optionally one or more external devices, such as different sample collection tubes. In some embodiments, when live help is being provided, the user GUI shows a live video image of a live agent, including the agent's hand 310 pointing to user GUI elements or to one or more external devices 320 in a user's environment. In other embodiments, the user's GUI can show a representation of a live help gesture, such as a representation of a finger or hand. In other embodiments, a user may see a representational action such as a finger touch, finger point, hand action such as picking up equipment, etc., without seeing a full projection of a person.

In some embodiments, live help or instructions can use a "mirror interface" that allows a user to see indications and actions on his interface as though he were looking in a mirror and the actions were being provided by an assistant. That is, the display for live help appears as the mirror image of the user's view. Such an interface can be useful for providing instructions on using home medical devices such as finger stick devices, bandages, etc., or for providing grooming or makeup instructions. In some embodiments, a combination of a mirror interface and a transparent or semitransparent interface may provide multiple ways of viewing information.

Figure 8:
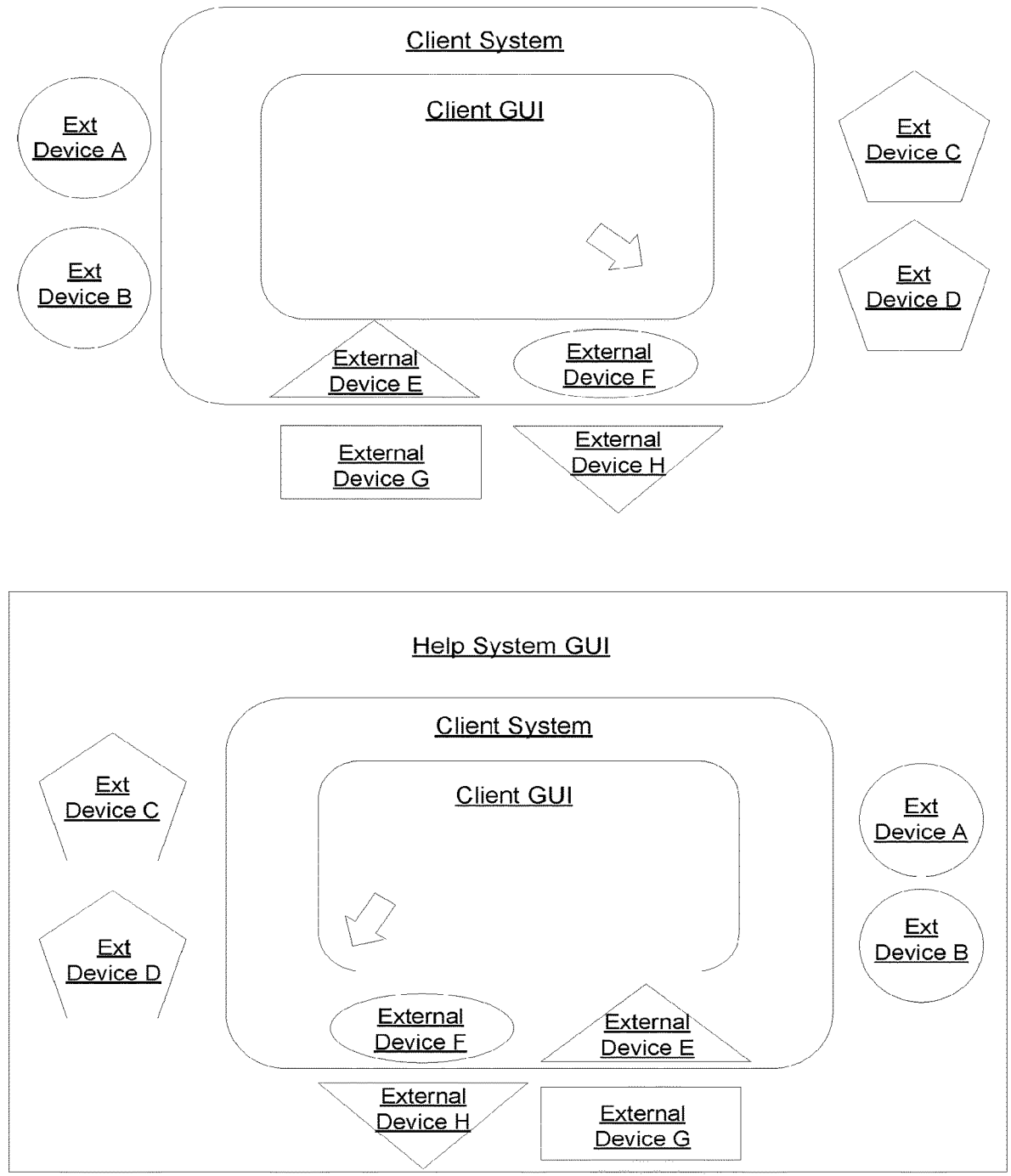
FIG. 8 is an example client computer system showing a client GUI and integrated and external devices according to specific embodiments and an example agent GUI showing a representation of a client GUI and representations of client integrated and external devices according to specific embodiments.

In some embodiments, the display for live help appears as though the user and live help are positioned on opposite sides of a transparent window. In this case, live help may have a display that indicates both what is presented on the user's GUI, as well as the relative position of peripheral devices, except in mirror image. Thus, items on the right side of the user's device and display appear on the left of the live help display. Left-to-right writing on the user's system appears right-to-left with letters reversed on the live help display. An example of this embodiment is shown in FIG. 8. In this case, the user environment, including a GUI, is displayed on a live help GUI as if see in a mirror or across a transparent sheet.

Live Help Provider Interface

In some embodiments, a live help system or method as described herein can provide some automated instructions or assistance, but generally will also provide help from a live human agent. The live help interface shows the help provider a representation of the user's location sufficient for the live help provider to provide meaningful gestural assistance. In some embodiments, the live help provider interface can also provide a "transparent window" display to a live help assistant, showing the user and the user's location. However, in other embodiments, for the user's privacy or other reasons, the live help interface may show only a representation of the user's location.

FIG. 4 is an example agent GUI showing a representation of a client GUI and representations of client integrated and external devices according to specific embodiments. As seen in this embodiment, an agent interface generally will include on its display representations of elements that are external to the user's display screen. This display allows a help provider to point to or indicate objects in the user environment by indicating or pointing to a graphical representation of objects in the user's environment.

According to specific embodiments, systems and methods as described herein store or acquire relative spatial information for parts of a user's computing device and optionally also for objects at a user's location. In the diagnostic lab bench example, it may be the case that different labs position key equipment, such as a centrifuge in different arrangements with respect to the GUI. In specific embodiments, the particular spatial information is used to provide more context related live help.

Also, as shown in FIG. 4, interactions on an agents GUI are translated to the appropriate display on a user's GUI. FIG. 4, for example, shows an arrow 410 indicating where an agent is pointing on the agent's GUI. In this example, an agent is indicating a representation of an external component 420. What the user sees on his system is the hand icon or other pointing indication 430 that is pointing to an actual external object 420 at the user's system. In some embodiments, a representation 430 of the user pointer is shown at the agent graphical interface for clarity.

In some embodiments, external devices may be placed behind the user's GUI. For example, a camera, a fingerprint reader, or a barcode scanner may be placed behind the GUI. To take a fingerprint, for example, a finger can be placed at the position on the GUI where the reader is. To scan a barcode, the item bearing the barcode can be positioned over the scanner in the GUI. To take a photograph, the person or thing to be photographed can be placed over the position in the GUI behind which is the camera. FIG. 4 shows an integral device positioned in the field of the user GUI. The live help GUI has a representation of the user GUI. An agent can instruct a user to use an integral device positioned behind the GUI by pointing to the position on the user's GUI where the integral device is located. This is depicted in FIG. 8, in which live help points to a position on the user GUI where a device is located.

Example Configuration of Multiple Systems

Figure 5:
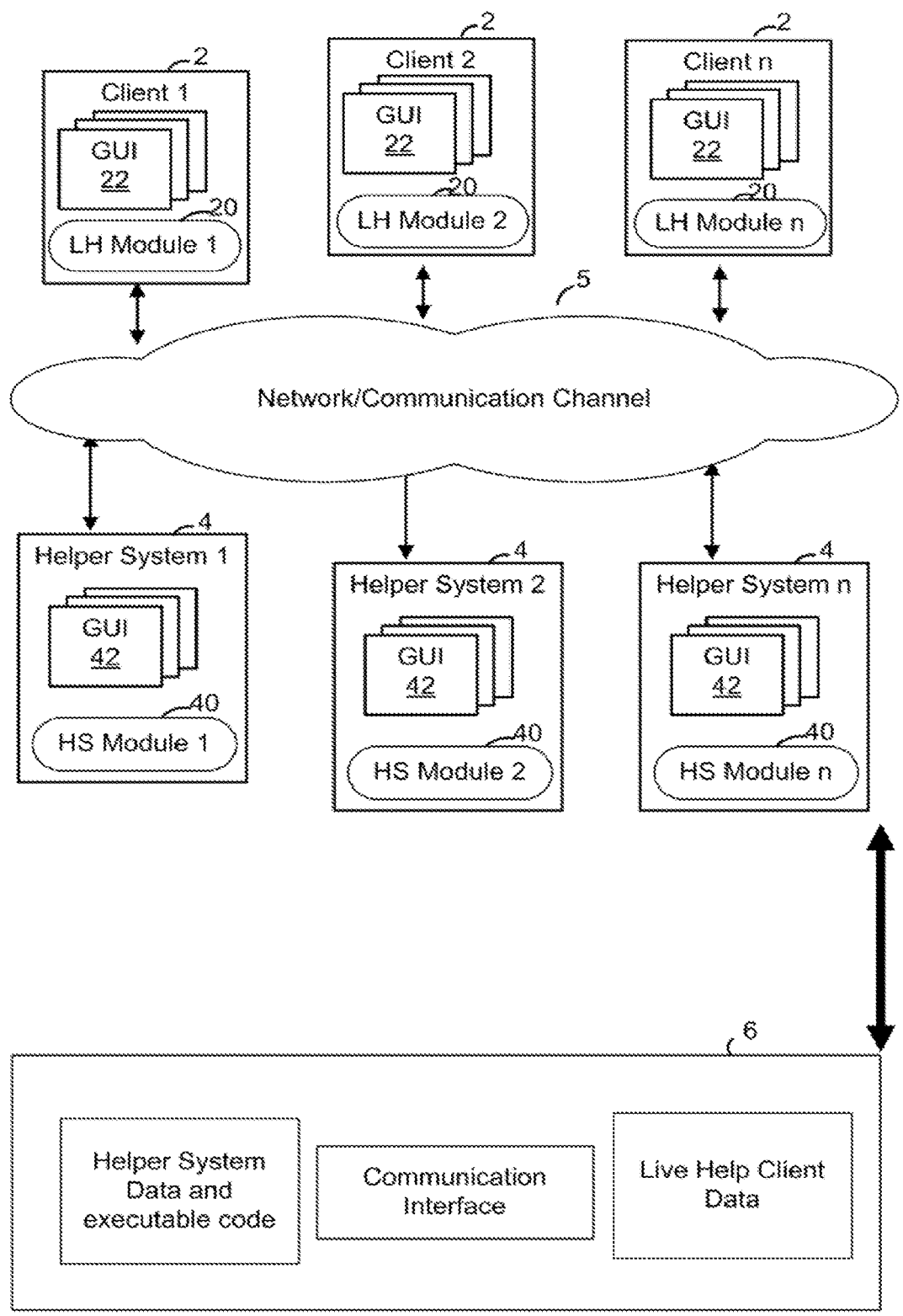
FIG. 5 is a block diagram illustrating a number of client systems and agent systems according to specific embodiments.

FIG. 5 is a block diagram illustrating a number of client systems and agent systems according to specific embodiments. It should be understood that various novel systems and methods as described herein are performed exclusively at one system and thus multiple systems or parties are not necessary to practice the invention except as specifically provided for in the claims.

FIG. 5 illustrates three representative client systems 2. These systems can be any type of computing system known in the art and are labeled 1-*n* to indicate any number of client systems. As will be understood in the art, a set of GUI's are provided at each system or to each system over a network such as network 5. These GUI's may be mostly the same across various systems 2 or may vary according to different systems. According to specific embodiments, at least one of these GUI's allows a user to request live help and to see a display of live help as described herein. LH modules 20 are any code or data at a client that is used to provide live help as described herein. In some embodiments, modules 20 will consist entirely of data and executable code delivered over a network. In other embodiments, modules 20 will include client specific data, such as user configuration data (whether a user wishes live help to automatically activate a camera for example or any other user related data). In some embodiments, modules 20 will contain location data indicating locations of items that are not part of the client's GUIs, but are outside the area of the display screen, as discussed above. Client systems 2 may include one or more user interface components that allow a remote agent to see a user's actions or otherwise perceive a user's actions. Such systems will typically include one or more camera components but may also include other components capable of registering user actions.

FIG. 5 further illustrates three representative agent systems 4. These systems can also be any type of computing system known in the art and are labeled 1-*n* to indicate any number of agent systems. As will be understood in the art, a set of GUI's are provided at each system or to each system over a network such as network 5. These GUI's may be mostly the same across various systems 4 or may vary according to different systems. According to specific embodiments, at least one of these GUI's allows an agent to respond to live help requests and to see a display of a user's GUI and other items at a user's location such as the user's face or body or images of various equipment. HS modules 40 are any code or data at an agent system that is used to provide live help as described herein. In some embodiments, modules 40 will consist entirely of data and executable code delivered over a network. In other embodiments, modules 40 will include client specific data, such as user configuration data (whether a user wishes live help to automatically activate a camera for example or any other user related data). In some embodiments, modules 40 will contain location data indicating locations of items that are not part of the client's GUIs, but are outside the area of the display screen, as discussed above. Agent systems 4 may include one or more interface components that allow a client to see a remote agent and to see an agent's actions with respect to the client's GUI and environment.

Network 5 can be any network or combination of networks of devices may communicate with one another in the live help system. For example, network 5 can be any one or any combination of a LAN (local area network), WAN (wide area network), telephone network, wireless network, point-to-point network, star network, token ring network, hub network, or other appropriate configuration. Network 5 can include a TCP/IP (Transfer Control Protocol and Internet Protocol) network, such as the global internetwork of networks often referred to as the Internet.

In specific embodiments, an agent system 4 will include one or more components that allow an agent to indicate objects on or off a user's GUI. Such components may include a touch screen, a mouse or track ball interface, one or more cameras, or one or more other position sensors.

In further embodiments, a live help server 4 is provided that can communicate with one or more agent systems and optionally one or more client systems. The server system may include primary or backup storage of client data, including location data and may provide one or more of the GUIs displayed at the client systems or agent systems.

Live Help Client/Server Data Model

Figure 6:
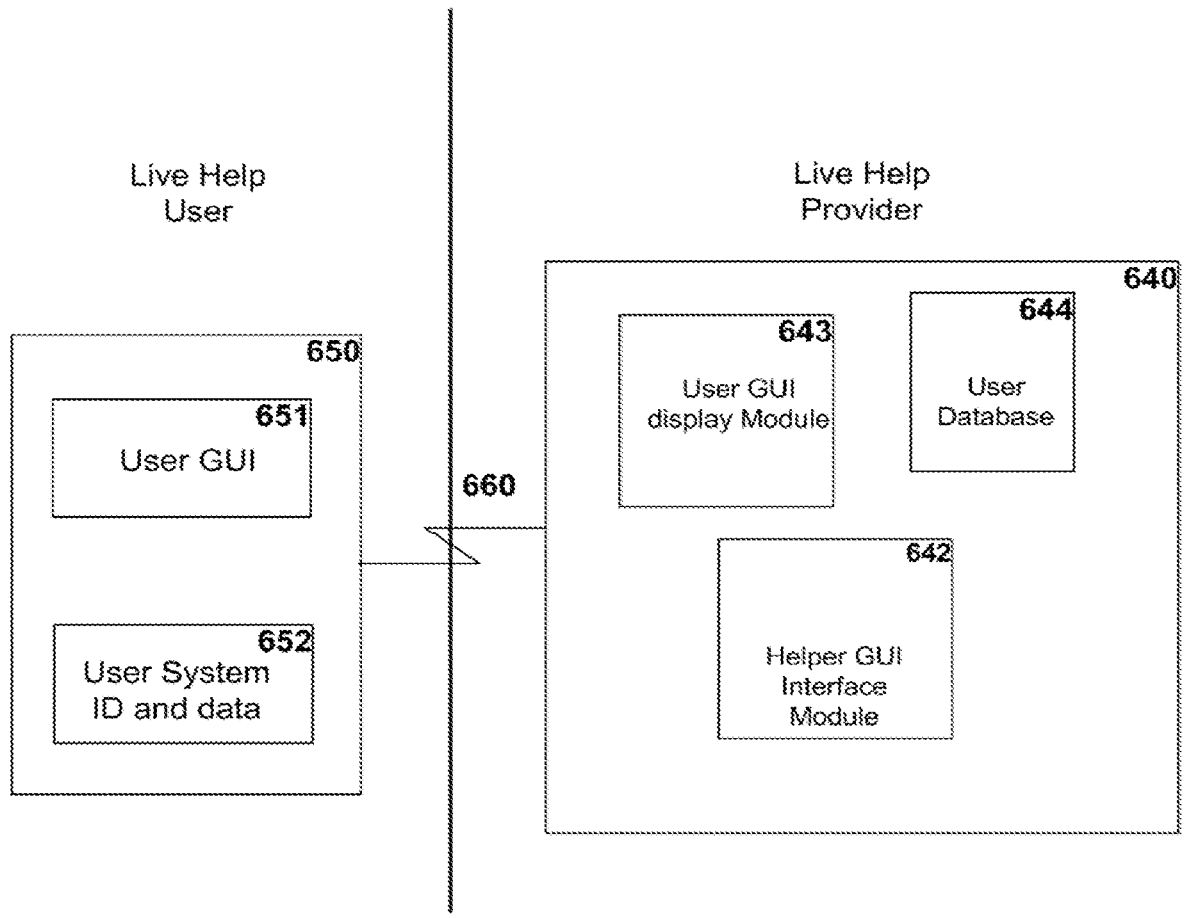
FIG. 6 is a block diagram showing user and agent data interactions according to specific embodiments.

FIG. 6 is a block diagram showing user and agent data interactions according to specific embodiments. User system or instrument 650 has a GUI interface 651 that displays data according to instructions stored at system 650 or received over a communication channel 660. The user GUI 651 may be a custom or proprietary GUI system or may wholly or in part use a standardized display rendering such as an HTML based browser. The user system generally stores identification data 652, which can include one or more of a system ID such as an IP or MAC address or other ID, system configuration data including the placement of any components external to the GUI. At initiation of a live help session, a request for live help is received from a user system or instrument 650 and that request generally includes some indication of the user's identity data 652.

The agent system 640 receives the request and uses the received data and optionally stored user data 644 to generate an agent interface using module 642. The interface module 642 captures input from the agent, provided by any input device, and translates that input into display commands appropriate for a live help user and transmits those commands using module 643.

Embodiment in a Programmed Information Appliance

Figure 7:
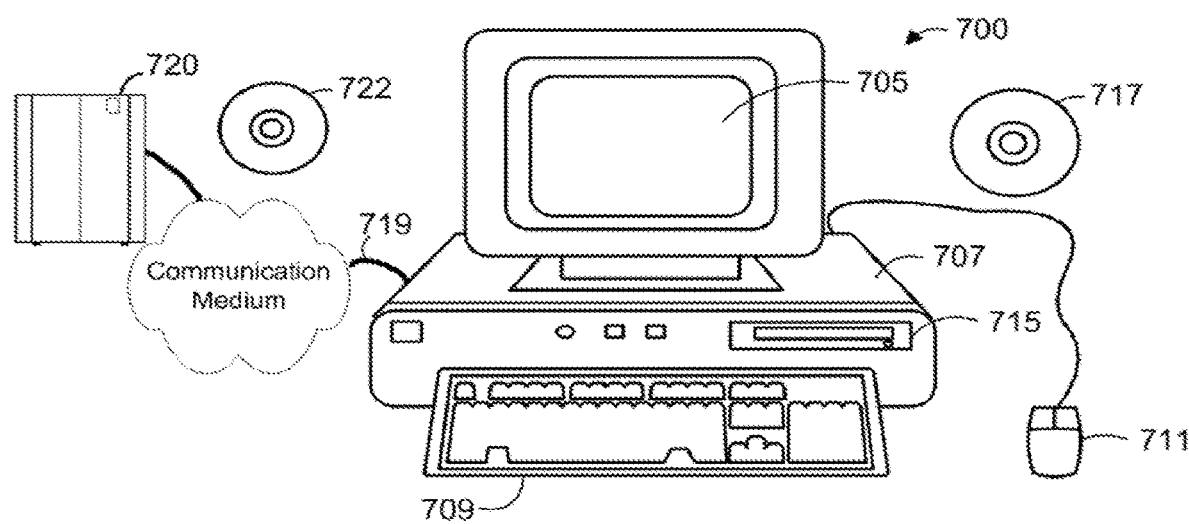
FIG. 7 is a block diagram showing a representative example logic device in which various aspects of the present invention may be embodied.

FIG. 7 is a block diagram showing a representative example logic device in which various aspects of the present invention may be embodied. As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a user on a fixed media for physically loading into a user's computer or a fixed media containing logic instructions may reside on a remote server that a user accesses through a communication medium in order to download a program component.

FIG. 7 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

Other Embodiments

The invention has now been described with reference to specific embodiments. Other embodiments will be apparent to those of skill in the art. In particular, a user digital information appliance has generally been illustrated as a personal computer. However, the digital computing device is meant to be any information appliance for interacting with a remote data application, and could include such devices as a digitally enabled television, cell phone, personal digital assistant, laboratory or manufacturing equipment, etc. It is understood that the examples and embodiments described herein are for illustrative purposes and that various modifications or changes in light thereof will be suggested by the teachings herein to persons skilled in the art and are to be included within the spirit and purview of this application and scope of the claims.

Furthermore, various different actions can be used to effect communication between a user and an agent. For example, a voice command may be spoken by the user, a key or screen area may be indicated, a button or screen area on an associated module or component may be indicated, or selection using any pointing device may be effected by the user.

All publications, patents, and patent applications cited herein or filed with this application, including any references filed as part of an Information Disclosure Statement, are incorporated by reference in their entirety.

The general structure and techniques, and more specific embodiments that can be used to effect different ways of carrying out the more general goals are described herein.

Although only a few embodiments have been disclosed in detail above, other embodiments are possible and the inventor (s) intend these to be encompassed within this specification. The specification describes specific examples to accomplish a more general goal that may be accomplished in another way. This disclosure is intended to be exemplary, and the claims are intended to cover any modification or alternative that might be predictable to a person having ordinary skill in the art.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The logic components described herein may be any kind of components, either general purpose, or some specific purpose components. The component architecture may be an Intel or AMD based architecture or any other logic processing architecture. An operating system, such as Linux, Unix, Windows, etc. may be included to provide various information handling functions. One or more components may include a handheld computer, such as a PDA, cellphone, or laptop, a handheld camera, etc.

The programs may be written in C, Python, Java, Brew, or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

Software Implementations

Various embodiments involving methods and/or systems for biometric or identifying information can be implemented on a general purpose or special purpose information handling appliance or logic enabled system, such as a laboratory or diagnostic or production system, using a suitable programming language such as Perl, Python, Java, C++, C#, Cobol, C, Pascal, Fortran, PL1, LISP, assembly, and any suitable data or formatting specifications, such as HTML, XML, dHTML, TIFF, JPEG, tab-delimited text, or binary. In the interest of clarity, not all features of an actual implementation are described in this specification. It will be understood that in the development of any such actual implementation (as in any software development project), numerous implementation-specific decisions must be made to achieve the developers' specific goals and subgoals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

Furthermore, it is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for providing live help to a user of a client device, the method comprising:
    receiving a request for help from the client device located at a user location;
    obtaining from the client device:
        external device data identifying additional devices external to and in proximity to the client device, the additional devices selected from the group consisting of medical devices, diagnostic devices, laboratory devices, and research devices; and
        location data representing spatial relationship(s) of the additional devices relative to the client device;
    displaying a live help provider graphical user interface in response to receiving the request for help, the live help provider graphical user interface depicting a provider graphical re presentation of the client device and respective provider graphical representations of the additional devices in a manner that identifies each of the additional devices and depicts the spatial relationship of each of the additional devices relative to the client device at the user location;
    processing inputs from a live help provider using the live help provider graphical user interface, wherein each input comprises specifying one of the respective provider graphical representations of the additional devices; and
    transmitting instructions to the client device, each instruction being configured to cause a n indicator to be displayed at a graphical user interface of the client device, the graphical user interface of the client device depicting respective client graphical representations of the additional devices in a manner that depicts the spatial relationship of each of the additional devices relative to the client device at the user location, the instructions corresponding, respectively, to the inputs from a live help provider, such that each indicator specifies one of the respective client graphical representations of the additional devices at the graphical user interface of the client device, thereby spatially indicating which of the additional devices for the user to operate.

2. The method of claim 1, further comprising:
    displaying or causing to be displayed one or more live help elements at the graphical user interface of the client device, the one or more live help elements appearing as though the graphical user interface of the client device were a transparent or semitransparent window and the live help provider were touching, gesturing, or indicating from the opposite side of the window.

3. The method of claim 1, further comprising:
    receiving the inputs from the live help provider from one or more of: a pointing device, a gesturing device, a keyboard, a motion capture device, and an imaging device.

4. The method according to claim 3, wherein the motion capture device includes one or more of: a camera, a proximity sensor, a smart glove, a sonar, and an echolocation sensor.

5. The method according to claim 1, wherein the live help provider is one or both of a remote human assistant and an automated help service.

6. The method according to claim 1, further comprising:
    presenting, at the live help provider graphical user interface, a virtual reality environment, the virtual reality environment configured to allow the live help provider to indicate one or more actions corresponding to the one or more additional devices at the user location.

7. A system for providing live help to a user of a client device, the system comprising:
    a processor; and
    a memory storing instructions that are configurable to cause the system to:
        receive a request for help from the client device locate data user location;
        obtain from the client device:
            external device data identifying additional devices external to and in proximity to the client device, the additional devices selected from the group consisting of medical devices, diagnostic devices, laboratory devices, and research devices; and
            location data representing spatial relationship(s) of the additional devices relative to the client device;
        display a live help provider graphical user interface in response to receiving the request for help, the live help provider graphical user interface depicting a provider graphical re presentation of the client device a nd respective provider graphical representations of the additional devices in a manner that identifies each of the additional devices and depicts the spatial relationship of each of the additional devices relative to the client device at the user location;

process inputs from a live help provider using the live help provider graphical user interface, wherein each input comprises specifying one of the respective provider graphical representations of the additional devices; and transmit instructions to the client device, each instruction being configured to cause an indicator to be displayed at a graphical user interface of the client device, the graphical user interface of the client device depicting respective client graphical representations of the additional devices in a manner that depicts the spatial relationship of each of the additional devices relative to the client device at the user location, the instructions corresponding, respectively, to the inputs from a live help provider, such that each indicator specifies one of the respective client graphical representations of the additional devices at the graphical user interface of the client device, thereby spatially indicating which of the additional devices for the user to operate.

8. The system of claim 7, wherein the instructions are further configurable to cause the system to:

display one or more live help elements at the graphical user interface of the client device, the one or more live help elements appearing as though the graphical user interface of the client device were a transparent or semitransparent window and the live help provider were touching, gesturing, or indicating from the opposite side of the window.

9. The system of claim 7, wherein
the one or more inputs from the live help provider are from one or more of: a pointing device, a gesturing device, a keyboard, a motion capture device, a nd an imaging device.

10. The system of claim 9, wherein the motion capture device includes one or more of: a camera, a proximity sensor, a smart glove, a sonar, and an echolocation sensor.

11. The system of claim 7, wherein the live help provider is one or both of a remote human assistant and an automated help service.

12. The system of claim 7, wherein the instructions are further configurable to cause the system to: present, at the live help provider graphical user interface, a virtual reality environment, the virtual reality environment configured to allow the agent to indicate one or more actions corresponding to the one or more additional devices at the location of the user.

13. A computer program product comprising a non-transitory computer-readable medium and computer-readable program code capable of being executed by one or more processors when retrieved from the non-transitory computer-readable medium, the program code comprising instructions configurable to cause:

receiving a request for help from the client device located at a user location;

obtaining from the client device:

external device data identifying additional devices external to and in proximity to the client device, the additional devices selected from the group consisting of medical devices, diagnostic devices, laboratory devices, and research devices; and location data representing spatial relationship(s) of the additional devices relative to the client device;

displaying a live help provider graphical user interface in response to receiving the request for help, the live help provider graphical user interface depicting a provider graphical re presentation of the client device and respective provider graphical representations of the additional devices in a manner that identifies each of the additional devices and depicts the spatial relationship of each of the additional devices relative to the client device at the user location;

processing inputs from a live help provider using the live help provider graphical user interface, wherein each input comprises specifying one of the respective provider graphical representations of the additional devices; and transmitting instructions to the client device, each instruction being configured to cause a n indicator to be displayed at a graphical user interface of the client device, the graphical user interface of the client device depicting respective client graphical representations of the additional devices in a manner that depicts the spatial relationship of each of the additional devices relative to the client device at the user location, the instructions corresponding, respectively, to the inputs from a live help provider, such that each indicator specifies one of the respective client graphical representations of the additional devices at the graphical user interface of the client device, thereby spatially indicating which of the additional devices for the user to operate.

14. The computer program product of claim 13, wherein the instructions are further configurable to cause:

displaying one or more live help elements at the graphical user interface of the client device, the one or more live help elements appearing as though the graphical user interface of the client device were a transparent or semitransparent window and the live help provider were touching, gesturing, or indicating from the opposite side of the window were touching, gesturing, or indicating from the opposite s ide of the window.

15. The computer program product of claim 13, wherein the instructions are further configurable to cause:

receiving the one or more inputs from the live help provider from one or more of: a pointing device, a gesturing device, a keyboard, a motion capture device, a nd an imaging device.

16. The computer program product of claim 13, wherein the live help provider is one or both of a remote human assistant and an automated help service.

17. The computer program product of claim 13, wherein the instructions are further configurable to cause:

presenting, at the live help provider graphical user interface, a virtual reality environment, the virtual reality environment configured to allow the live help provider to indicate one or more actions corresponding to the additional devices at the location of the user.

* * * * *